United States Patent [19]

Kachi

[11] Patent Number: 5,602,859
[45] Date of Patent: Feb. 11, 1997

[54] START-STOP SYNCHRONOUS COMMUNICATING METHOD CAPABLE OF CORRECTING IMPROPER SYNCHRONIZATION AND SYSTEM USING THE SAME

[75] Inventor: Seiji Kachi, Tokyo, Japan

[73] Assignee: NEC Corporation, Japan

[21] Appl. No.: 358,253

[22] Filed: Dec. 19, 1994

[51] Int. Cl.[6] .................................................. G06F 11/00
[52] U.S. Cl. ............................ 371/47.1; 371/5.4; 371/42; 395/182.1; 364/266.1; 364/269
[58] Field of Search ................................. 371/47.1, 49.1, 371/49.2, 49.3, 49.4, 50.1, 51.1, 46, 42, 5.4; 395/182.1; 364/266.1, 269

[56] References Cited

U.S. PATENT DOCUMENTS

| | | | |
|---|---|---|---|
| 4,516,237 | 5/1985 | Perry et al. | 370/58 |
| 4,539,677 | 9/1985 | Lo | 370/85 |
| 4,564,937 | 1/1986 | Perry et al. | 370/58 |
| 4,594,712 | 6/1986 | Perry et al. | 371/49.1 |
| 4,594,713 | 6/1986 | Perry et al. | 370/49.1 |
| 4,598,404 | 7/1986 | Perry et al. | 371/49.1 |
| 4,807,258 | 2/1989 | Sieber et al. | 375/108 |
| 5,226,173 | 7/1993 | Sasaki et al. | 395/800 |
| 5,353,434 | 10/1994 | Katayama | 395/550 |
| 5,361,374 | 11/1994 | Sasaki et al. | 395/800 |
| 5,363,418 | 11/1994 | Nakano et al. | 375/117 |

FOREIGN PATENT DOCUMENTS 57-53163  3/1982  Japan.

Primary Examiner—Robert W. Beausoliel, Jr.
Assistant Examiner—Dieu-Minh Le
Attorney, Agent, or Firm—Ostrolenk, Faber, Gerb & Soffen, LLP

[57] ABSTRACT

A method of carrying out start-stop synchronous communications is disclosed in which, when improper synchronization takes place owing to the transmission of a recovery frame for improper synchronization having information bits all indicating "0" subsequent to an information frame for transmission, a framing error is produced and the improper synchronization is detected on a receiving side and proper or normal synchronization is established upon receipt of the next frame. Here, a recovery frame for improper synchronization having information bits that all indicate "0" is transmitted immediately after an information frame. When any "0" in a data bit section of the information frame immediately before the frame of all 0 bits is misrecognized as a start bit upon receipt, "0" of the recovery frame is always placed in the position of the stop bit of the misrecognized frame so that a framing error is produced. Since an edge that falls from "1" to "0" does not exist in the recovery frame for improper synchronization, a start bit of the next frame can be accurately supplemented so that an improper synchronizing state is returned to a normal synchronizing state.

3 Claims, 3 Drawing Sheets

START-STOP SYNCHRONOUS COMMUNICATING METHOD CAPABLE OF CORRECTING IMPROPER SYNCHRONIZATION AND SYSTEM USING THE SAME

BACKGROUND OF THE INVENTION

1. Field of the Invention

The present invention relates to start-stop synchronous communicating method capable of recovering improper synchronization produced when information is transferred through the use of start-stop synchronous communications and to a system using the start-stop synchronous communicating method.

2. Description of the Related Art

As this type of improper synchronization recovering method, there has been known one disclosed in Japanese Patent Application Laid-Open No. 57-53163 (53163/82), for example. According to the disclosure, a frame comprised of information bits all having a logic level identical to an idle state has been used to correct the improper synchronization. A description will now be made of the conventional improper synchronization recovering method referring to FIG. 1. In the following description, one frame will be regarded a comprising one bit set as a start bit (ST), seven bits set as character bits and one bit set as a stop bit (SP). In accordance with the usage of a serial line, the start bit and the stop bit are respectively regarded as a digit "0" and a digit "1". Further, when all of the character bits have a digit "1", the character bits are regarded to represent the idle sate.

When a receiving side enters into a receiving operation while a transmitting side is transmitting an information bit (3a-2) of an information frame (3a), the receiving side interprets a bit (3a-3) having the first trailing edge a start bit. As a result, improper synchronization takes place on the receiving side. The eighth bit (3b-2) as counted from the start bit in the information frame placed to the improper synchronization is interpreted as a stop bit. Since a frame comprising information bits all indicating "1" is used to correct the improper synchronization in the conventional system, bit (3b-2) is represented as "1". Thus, bit (3b-2) is regarded as being identical to the normal stop bit and a frame having a bit range from the bit (3a-3) to the bit (3b-2) is received as a normal frame.

Since information bits in a recovery frame for improper synchronization are all "1" even when the receiving side has entered into an operation for receiving the next frame, the improper synchronization is no longer produced. Thus, since a frame start or frame start pulse can be detected based on a start bit (3c-1) in th next information frame (3c), the next information frame (3c) can be accurately detected.

In this type of conventional improper synchronization correcting system, an improper synchronizing state can be satisfactorily changed to a normal synchronizing state. However, since an alarm is not sounded upon a change, the improper synchronizing state is returned to the normal synchronizing state without any indication of the occurrence of the improper synchronization. Thus, the conventional improper synchronization correcting system has a drawback in that even when improper characters are being received during communications, such reception cannot be determined as improper.

SUMMARY OF THE INVENTION

With the foregoing drawback in view, it is an object of the present invention to provide a start-stop synchronous communicating method capable of detecting the occurrence of improper synchronization and returning an improper synchronizing state to a normal synchronizing state and system using the start-stop synchronous communicating method.

According to one aspect of the present invention, for achieving the above object, there is provided a method of effecting start-stop synchronous communications wherein a plurality of information frames, each comprising a start bit having a first logic level information bits sent subsequent to the start bit and having the predetermined number of bits and a stop bit sent subsequent to the information bits and having a second logic level are transferred between a transmitting side and a receiving side, comprising the following steps of:

forming a recovery frame for improper synchronization comprising the information bits all having the first logic level;

selecting adjacent suitable information frames from the plurality of transferred information frames and inserting the recovery frame for improper synchronization between the selected information frames; and detecting that improper synchronization has produced in an information frame preceding to the inserted recovery frame for improper synchronization from the fact that when the improper synchronization occurs in the preceding information frame, no stop bit is detected in the preceding information frame at a proper position in the preceding information frame.

Where a parity bit is added to the information bits of each of the frames and the parity bit in one of the information frames is set to the first logic level when information bits excluding the parity bit in the one information frame are all the first logic level, the parity bit is preferably regarded as an information bit. Further, where a parity bit is added to the information bits and the parity bit in one of the information frames is set to the second logic level when information bits excluding the parity bit in the one information frame are all the first logic level, the parity bit is preferably regarded as a stop bit.

According to another aspect of the present invention, there is provided a system for effecting start-stop synchronous communications, wherein a plurality of information frames, each comprising a start bit having a first logic level, information bits sent subsequent to the start bit and having the predetermined number of bits and a stop bit sent subsequent to the information bits having a second logic level, are transferred between a transmitting side and a receiving side, comprising:

frame forming means for forming a recovery frame for improper synchronization comprising the information bits all having the first logic level;

frame insisting means for selecting adjacent suitable information frames from the plurality of transferred information frames and inserting the recovery from for improper synchronization between the selected information frames; and improper synchronization detecting means for detecting that improper synchronization has been produced in an information frame preceding to the inserted recovery frame for improper synchronization from the fact that when the improper synchronization occurs in the preceding information frame, no stop bit is detected in the preceding information frame has been undetected at a proper position in the preceding information frame.

The above and other objects, features, and advantages of the present invention will become apparent from the following description referring to the accompanying drawings which illustrate an example of a preferred embodiment of the present invention.

DETAILED DESCRIPTION OF THE PREFERRED EMBODIMENT

Figure 1:
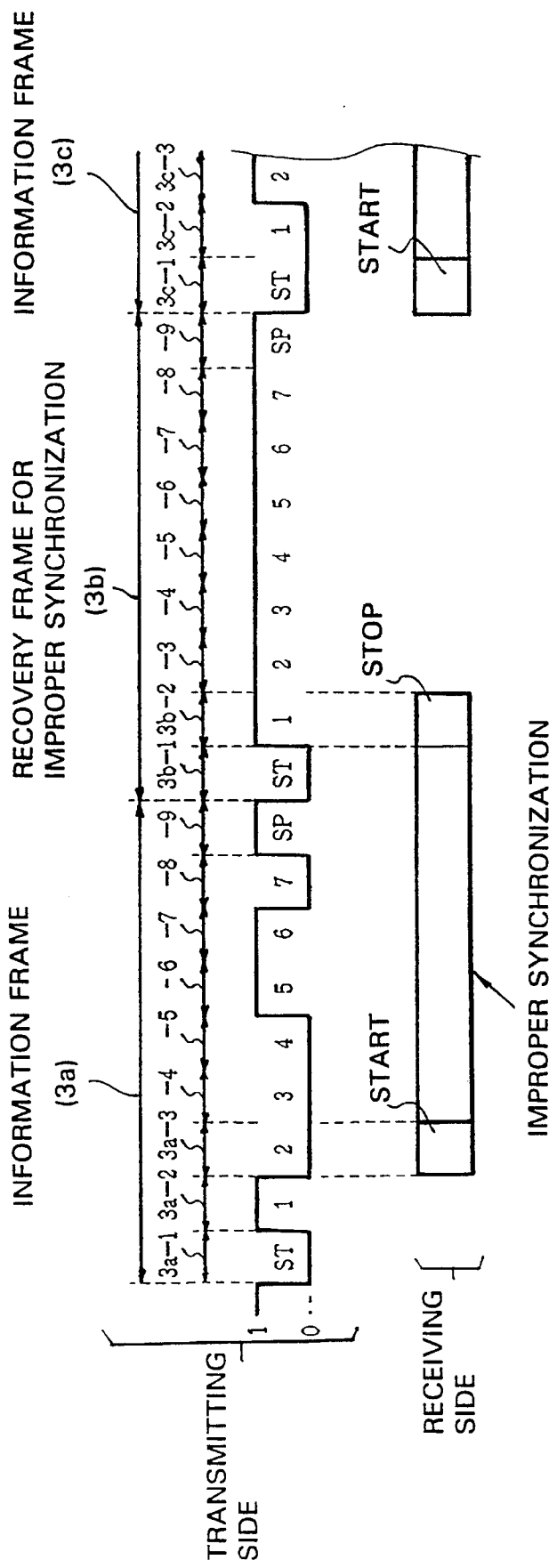
FIG. 1 is a timing chart for describing signals to be transmitted and received, which are employed in a conventional example.
Figure 2:
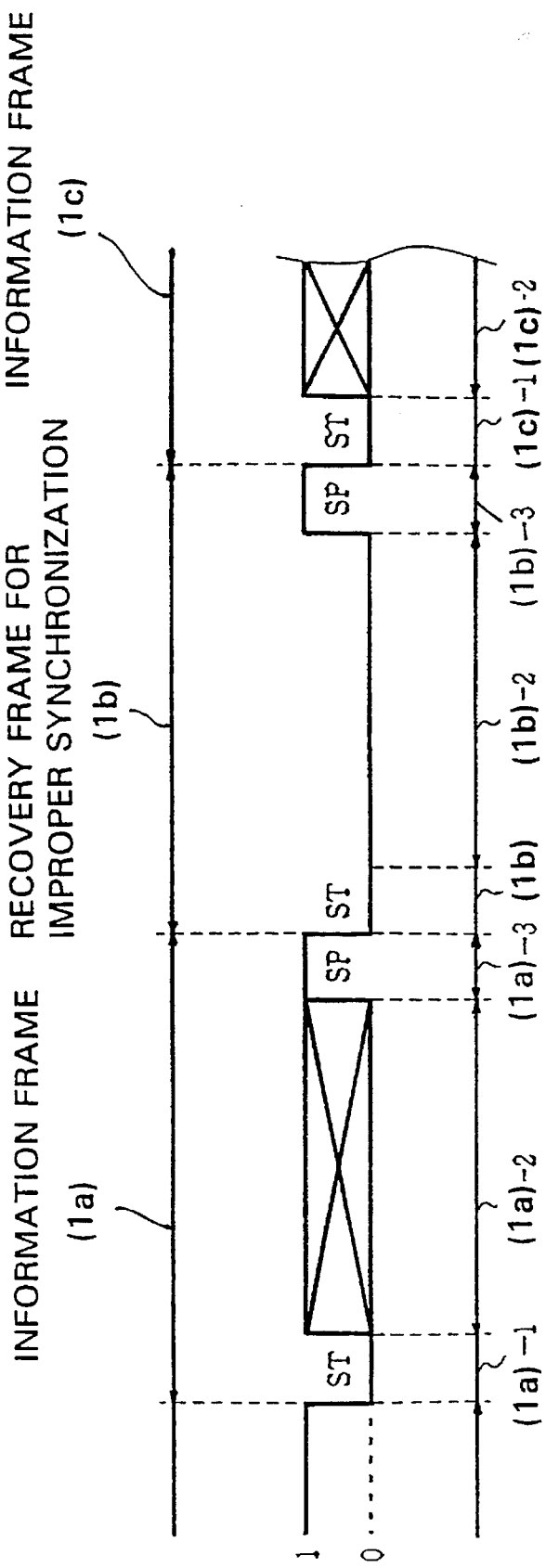
FIG. 2 is a timing chart for describing a normal transmitting signal employed in one embodiment showing a start-stop synchronous communicating method of present invention.
Figure 3:
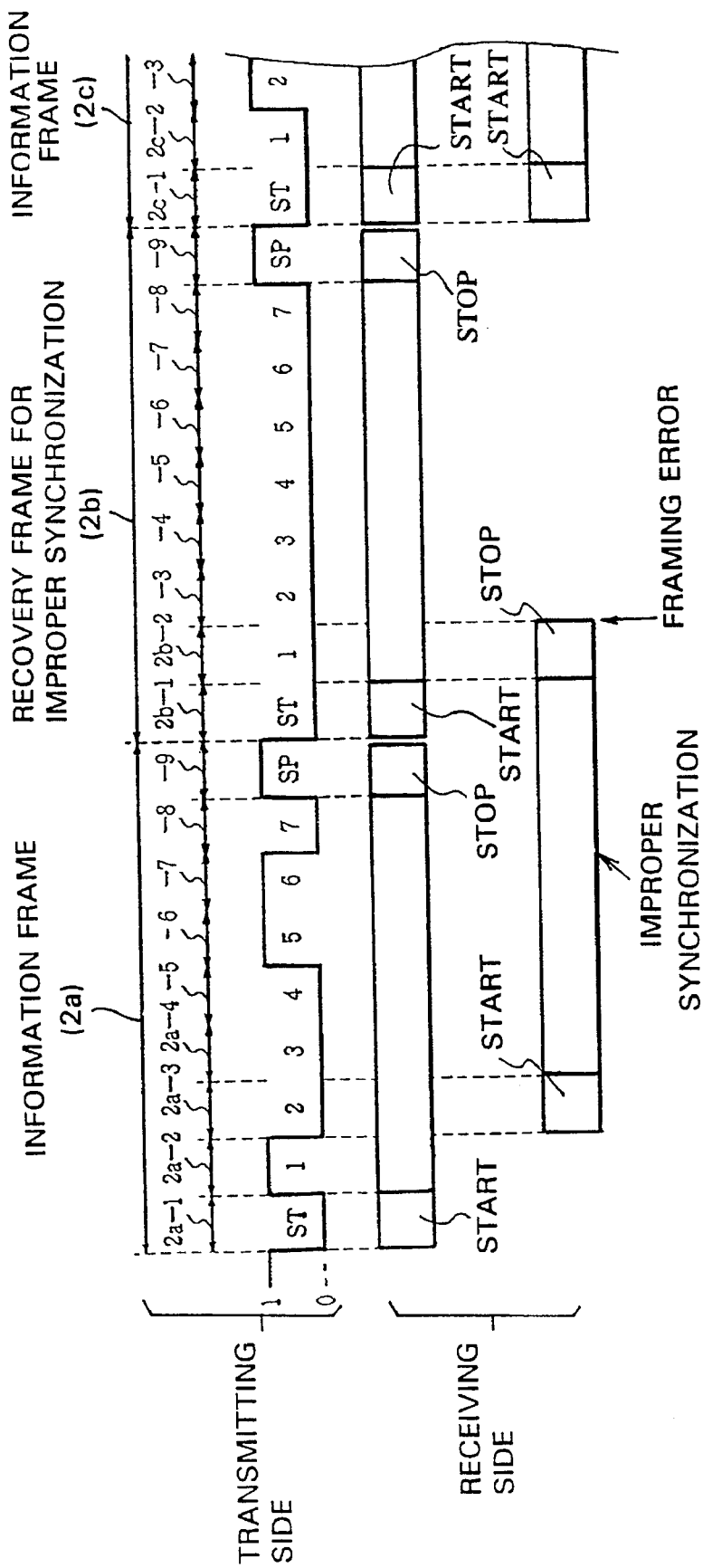
FIG. 3 is a timing chart or describing the manner in which improper synchronization is detected during the operation of the embodiment shown in FIG. 2.

In a preferred embodiment of the present invention, shown in FIGS. 2 and 3, start-stop synchronous communications will hereinafter be considered as being carried out based on a frame structure identical to the structure of a frame employed in a conventional example shown in FIG. 1. Specifically, a start bit is represented as "0" and a stop bit and an idle state are both represented as "1" as shown in FIGS. 2 and 3. Symbols (1a) and (1c) indicate information frames respectively and symbol (1b) indicates a recovery frame for improper synchronization.

Symbols (1a-1), (1b-1) and (1c-1) indicate start bits, (1a-2), (1b-2) and (1c-2) indicate information bits, and (1a-3) and (1b-3) indicate stop bits. The logic level of all the information bits in the recovery frame for improper synchronization is identical to that of the start bits, i.e., "0".

In normal receiving state, the bits (1a-1) and (1a-3) are recognized as the start bit and the stop bit respectively. Therefore, the start bit (1b-1) and the stop bit (1b-3) in the improper synchronization recovery frame (1b) to be next received can also be recognized properly. The recovery frame for improper synchronization is received as a frame comprising information bits all indicating "0". Since a special frame having information bits all corresponding to "0" is used to correct the improper synchronization, a decision cannot be made as to whether a NULL frame or a recovery frame for improper synchronization is used when a frame (hereinafter called "NULL frame" to distinguish from the recovery frame for improper synchronization) identical to the recovery frame for improper synchronization employed between information frames. Therefore, when it is desired to use the NULL frame in the information frame, the NULL frame is sent twice in succession as in the case of an expanded basic procedure only when the NULL frame is sent and the NULL frames sent twice in succession are interpreted as a single NULL frame on a receiving side (receiving station). Thus, the transparency of data can be maintained as it is. In this case, the detection of the NULL frames sent twice in succession is performed separately from the detection of the improper synchronization.

When a start-stop synchronous serial communication is carried out, distinction cannot be made between the start bit and "0" in the information bits. Therefore, when the transmitting side (transmitting station) and the receiving side start up in asynchronism with each other, there is a case where "0" in region (1a-2) corresponding to an information bit region is improperly recognized as a start bit. In this case, the stop bit in the improperly-recognized frame exists in either the start bit (1b-1) of the improperly recognized recovery frame or the information bit region (1b-2) all bits of which are "0". Since the stop bit must be "1", an error (framing error) caused by non-detection of the stop bit is produced on the receiving side. Thus, the stop bit in the improperly recognized frame can be recognized as being improperly synchronized due to the produced error. Further, since all the information bits in the recovery frame for improper synchronization are "0", no trailing edge appears up to the start bit (1c-1) in the next frame. Since the edge that falls from "1" to "0" is used to detect the start bit, the start (1c-1) in the next information frame can be accurately supplemented so that the proper synchronization can be established.

To describe the present embodiment more specifically, a specific example is shown in FIG. 3 by a sequence in which a start, characters, a stop and an information bit string immediately before a recovery frame for improper synchronization are respectively represented as one bit, seven bits, one bit and the seven bits being "1000110".

Since an information frame (2a) is properly received in a normal synchronizing state, the following recovery frame for improper synchronization can also be properly received.

When the receiving side enters into a receiving state while a bit (2a-2) is being transmitted by the transmitting side, bit (2a-3) including an edge that falls from "1" to "0" in data is interpreted as a start bit, thereby leading to the improper synchronization. In this case, an information bit (2b-2) in the recovery frame for improper synchronization, which corresponds to an 8th bit as counted from the start bit, interpreted as a stop bit. Since all the information bits in the recovery frame for improper synchronization are "0", a training error is produced under the state in which "0" has been received at the position of the stop bit. It is therefore possible to detect the improper synchronization.

Since all of the information bits in the recovery frame for improper synchronization are "0", th edge that falls from "1" to "0" which serves as the trigger for the following data reception, does not appear up to a start bit (2c-1) in the next frame (2c) after the framing error has been produced. Thus, when the receiving side enters into the next data receiving operation immediately after the framing error has been produced, the normal synchronizing state can be established.

In communications using serial lane, synchronization is normally established and confirmed at regular intervals using specific frame. When the system according to the present invention is used, improper synchronization can be recovered without impairment of the efficiency of a line by using a recovery frame for improper synchronization or both correcting and establishing synchronization. Further, the occurrence of improper synchronization can also be detected, and owing to the detection of the improper synchronization, necessary processes such as issuing an alarm etc. can be performed.

If a communication is established such that a parity bit is regarded as "0" when the parity bit exists and all of the information bits are "0", then a sequence identical to the sequence employed in the present invention is obtained by regarding the parity bit as an information bit. On the other hand, if a communication is established such that the parity bit is taken as 1"1" when all of the information bits are "0", then a sequence identical to the sequence employed in the present invention is obtained by regarding the parity bit as a stop bit. Thus, although the communication in FIG. 3 is established on the assumption that the parity does not exist, the present invention can be applied in cases where a parity bit does exists.

According to the present invention as described above, improper synchronization can be detected on a receiving side after a transmitting side has transmitted a frame in which all of the information bits have a logic level identical to that of the start bit immediately after a stop bit of the just previous transmitted frame. Then, an error (framing error) will be detected, because the receiving side cannot detect the stop bit in a proper position, and the improper synchronization is detected on the receiving side. Further, the normal synchronization can also be established upon receipt of the next frame by the receiving side.

It is to be understood, however, that although the characteristics and advantages of the present invention have been set forth in the foregoing description, the disclosure is illustrative only, and changes may be made in the arrangement of the parts within the scope of the appended claims.

What is claimed is:

1. A method for detecting improper synchronization in start-stop synchronous communications, wherein a plurality of information frames are transferred bit-serially from a transmitting side to a receiving side, each of said information frames includes a start bit having a first logic level, information bits sent subsequent to the start bit and having a predetermined number of n bits, and a stop bit sent subsequent to the information bits and having a second logic level, and at the receiving side each information frame is reconstructed from the received signal by detecting a start bit whose logic level is the first logic level, the logic level at the first level having changed from a prior bit at the second logic level, by detecting said predetermined number of n bits as the information bits, and by detecting a bit of the second logic level as the stop bit, said method comprising the steps of:

transmitting said plurality of information frames from the transmitting side;

inserting a recovery frame between selected adjacent information frames, said recovery frame including all information bits having the first logic level;

receiving and reconstructing information frames and recovery frames from the received signal at the receiving side;

detecting improper synchronization in the received signal by detecting a bit at the stop bit position in a received frame as being a first logic level; and establishing a proper synchronization immediately upon receiving a next information frame.

2. The method as claimed in claim 1, wherein each recovery frame is inserted after each message, which is a unit of transmission and includes a variable number of information frames, with established frame intervals being the same as message intervals.

3. An apparatus for detecting improper synchronization in start-stop synchronous communications, wherein a plurality of information frames are transferred bit-serially from a transmitting side to a receiving side, each of said information frames includes a start bit having a first logic level, information bits sent subsequent to the start bit and having a predetermined number of n bits, and a stop bit sent subsequent to the information bits and having a second logic level, and at the receiving side each information frame is reconstructed from the received signal by detecting a start bit whose logic level is the first logic level, the logic level at the first level having changed from a prior bit at the second logic level, by detecting said predetermined number of n bits as the information bits, and by detecting a bit of the second logic level as the stop bit, said apparatus comprising:

frame forming means forming a recovery frame including all said information bits having said first logic level;

transmitting means transmitting said information frames bit-serially from the transmitting side;

frame inserting means inserting said recovery frame between said transmitting information frames at established frame intervals;

receiving means receiving and reconstructing each information frame and each recovery frame from the received signal at the receiving side; and improper synchronization detecting means detecting and recovering from an improper synchronization in the received signal by detecting a bit at the stop bit position in each reconstructed information frame as being a first logic level and establishing a proper synchronization immediately upon receiving a next information frame.

* * * * *